(12) United States Patent
Vu

(10) Patent No.: US 7,001,227 B1
(45) Date of Patent: Feb. 21, 2006

(54) PERSONAL FLOATATION AND RESCUE DEVICE

(76) Inventor: Thang D. Vu, 2909 Douglas Dr. North, Crystal, MN (US) 55422

( * ) Notice: Subject to any disclaimer, the term of this patent is extended or adjusted under 35 U.S.C. 154(b) by 0 days.

(21) Appl. No.: 11/127,013

(22) Filed: May 11, 2005

(51) Int. Cl.
*B63H 9/00* (2006.01)

(52) U.S. Cl. .............................. 440/8; 441/36; 441/80

(58) Field of Classification Search ................ 114/345, 114/90; 440/8; 441/35, 36, 80, 89
See application file for complete search history.

(56) References Cited

U.S. PATENT DOCUMENTS

| | | | |
|---|---|---|---|
| 692,278 A * | 2/1902 | Hamberger et al. | ........... 441/89 |
| 3,212,470 A * | 10/1965 | Wiggin | ........................... 440/8 |
| 4,669,407 A * | 6/1987 | Cobb | ...................... 114/39.22 |
| 5,580,287 A | 12/1996 | Wieringa | |
| 5,711,240 A | 1/1998 | Baker | |
| 6,394,867 B1 | 5/2002 | Bianco | |
| 6,526,901 B1 * | 3/2003 | Iacoboni | ...................... 114/90 |
| 6,558,082 B1 | 5/2003 | Carmichael et al. | |
| D481,435 S | 10/2003 | Zheng | |
| 6,659,689 B1 | 12/2003 | Courtney et al. | |
| 6,902,447 B1 * | 6/2005 | Pittman | ......................... 440/8 |

* cited by examiner

*Primary Examiner*—Stephen Avila
(74) *Attorney, Agent, or Firm*—Lawrence J. Gibney, Jr.

(57) ABSTRACT

The present invention is a device to be used in emergency situations requiring floatation and rescue. An inflatable raft with a waterproof cover is connected to a telescopic shaft equipped with electric generators and wind catchers. The electricity, which is produced powers a motor and propeller underneath and outside the raft.

2 Claims, 3 Drawing Sheets

PERSONAL FLOATATION AND RESCUE DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to a personal floatation device. The present invention further relates to energy producing rafts that store in compact personal bags.

B. Prior Art

Prior art exists which provides personal floatation devices used in emergency situations. Bianco U.S. Pat. No. 6,394,867 is a self-inflating device, which is compactly stored as a vehicle seat. Courtney U.S. Pat. No. 6,659,689 is a floatation device that is integrated into the clothing of its user. Courtney is a ballast and an emergency signaling device to be used in conjunction with a floatation device. There is nothing in the prior art that provides an emergency floatation device with an electricity generator and motor as well as a rain protector.

BRIEF SUMMARY OF THE INVENTION

The present invention is a floatation and safety device, which can be stored in a bag the size of a backpack. The present invention acts as a raft and uses wind to produce electricity. The electricity will power a small motor that propels the raft through the water. The raft is covered by a waterproof shell to protect the user. A strobe light is powered by the produced electricity so that a user may be spotted and rescued during an emergency.

It is an object of this device to produce an item that can be used on the water to protect an individual from inclement weather while at the same time have the capability to generate a small amount of electricity. It is a further object to produce an item that will alert persons to the location of individuals by use of a light-emitting device, which may also send out a radio frequency signal.

DETAILED DESCRIPTION OF THE EMBODIMENTS

Figure 1:
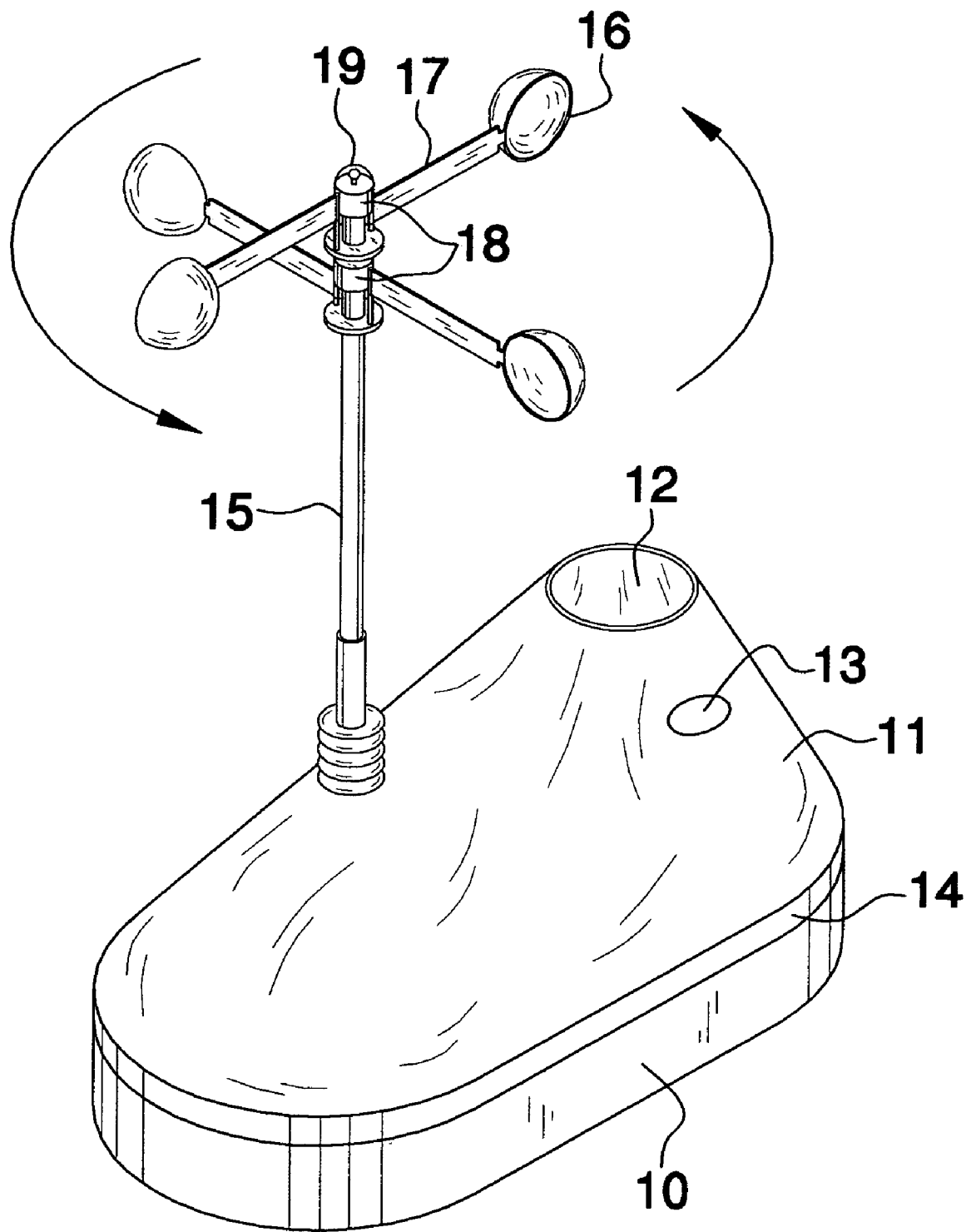
FIG. 1 is a perspective view of the device.
Figure 2:
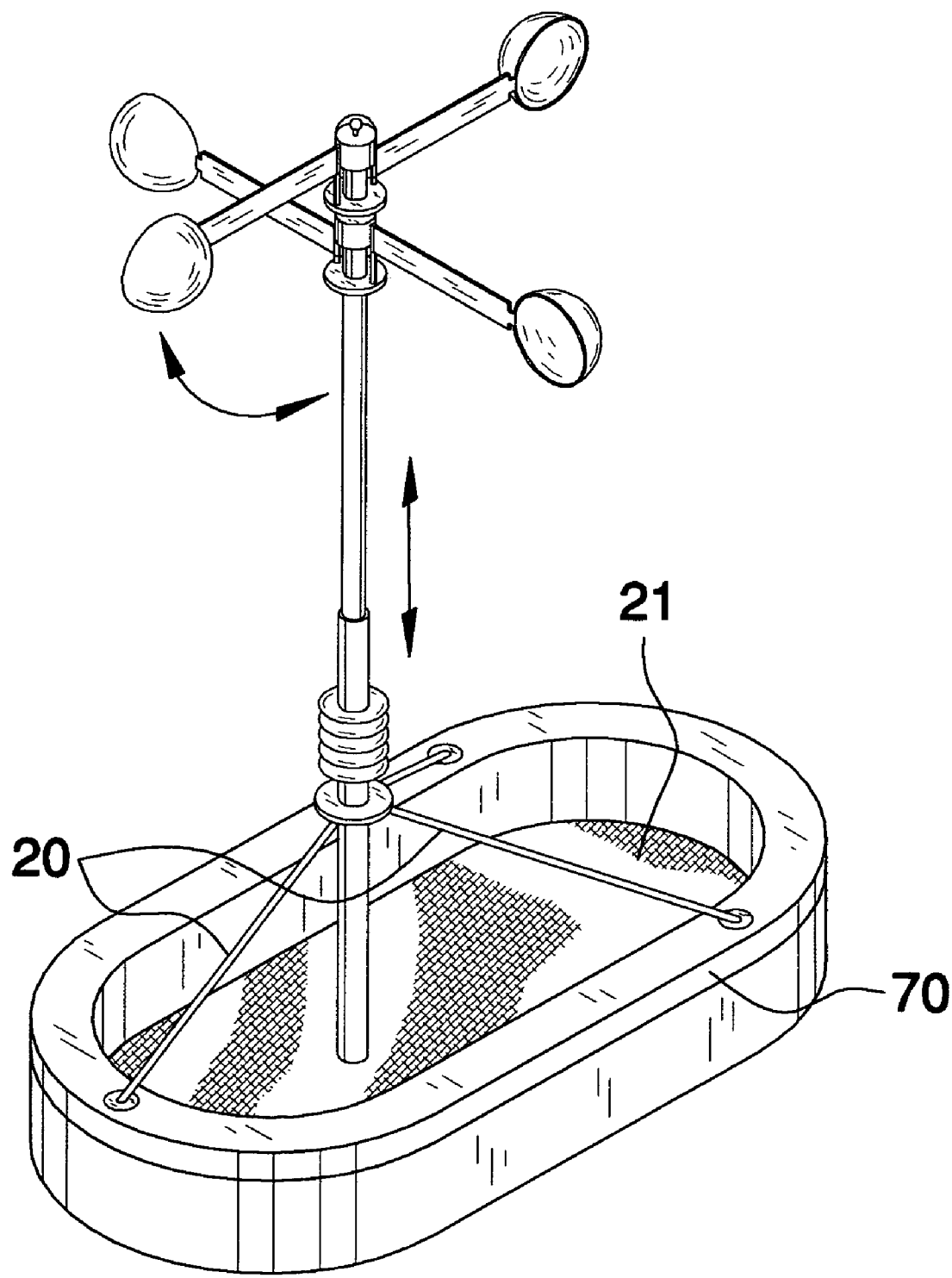
FIG. 2 is a perspective view of the device with the protective covering removed.
Figure 3:
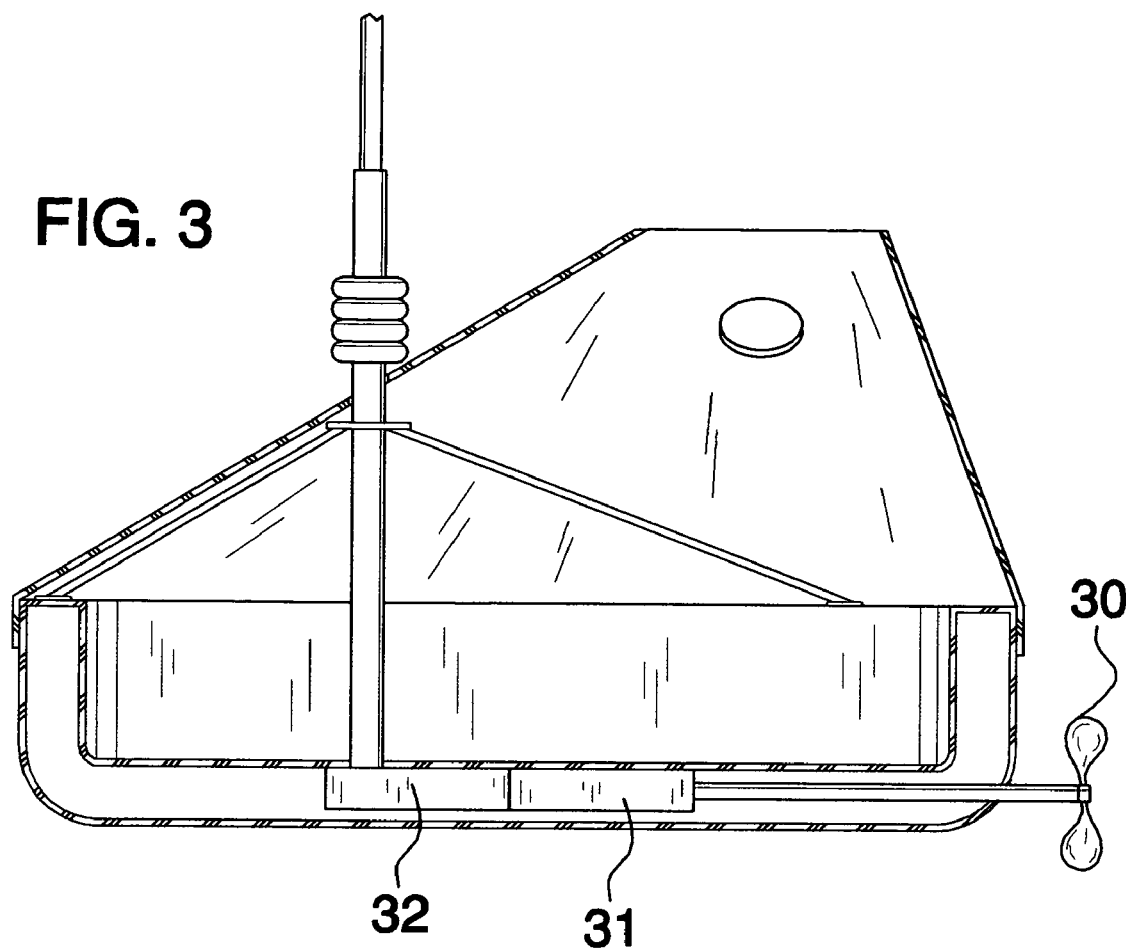
FIG. 3 is a cross section view of the device from the left side.

The present invention is an inflatable raft 10 that acts as a life floatation and rescue mechanism during emergency situations. The raft 10 is most likely made of durable rubber or plastic and is waterproof and has a bottom 21, side walls 70, and an open top. A false bottom is provided to store the battery 32, electric motor 31 and propeller shaft for the propeller 30. FIG. 3 The top of the raft 10 is covered by a waterproof covering 11. FIG. 1.

The waterproof covering 11 has an opening 12 for the user to insert his/her head and two openings 13 on either side of the head opening 12 for the insertion of the user's arms. FIG. 1 The waterproof covering 11 is most likely constructed of flexible and durable plastic. The waterproof covering 11 is attached to the raft 10 by way of a securement means 14, most likely a hook and loop assembly. The waterproof covering 11 will not only keep the user dry, but will also keep the user warm and protected from severe winds.

Extending upward from the raft 10 is a telescopic shaft 15. The shaft 15 is secured in place through a plurality of support members 20 attached to the sides of the raft 10. FIG. 1, 2 At the top of the shaft 15 will be four wind catching devices or cups 16 designed to catch and move with the wind. Two cups 16 are connected to each other and spin around the shaft 15 attached to elongated arms 17 and produce electricity within electric generators 18 located in the shaft 15; the other two cups 16 will be attached to each other and spin in the opposite direction. Generators 18 are installed at the end of the cups 16 to generate electricity. The shaft 15 extends to the bottom of the raft 21 and is secured to a battery 32. The battery 32 absorbs the energy produced by the cups 16 and generators 18. FIG. 1.

The battery 32 provides energy to an emergency strobe light 19 located at the very top of the shaft 15. The strobe light 19 will alert rescuers to the location of the raft 10. The device may also emit a radio frequency signal to alert others in the area of the location of the individual. The battery 32 also provides power to an electric motor 31 located underneath the raft 10. FIG. 3 The motor 31 is connected to a shaft which turns a propeller 30; the propeller extends outside of the raft 10 and will propel the raft 10 through water. FIG. 3.

Figure 4:
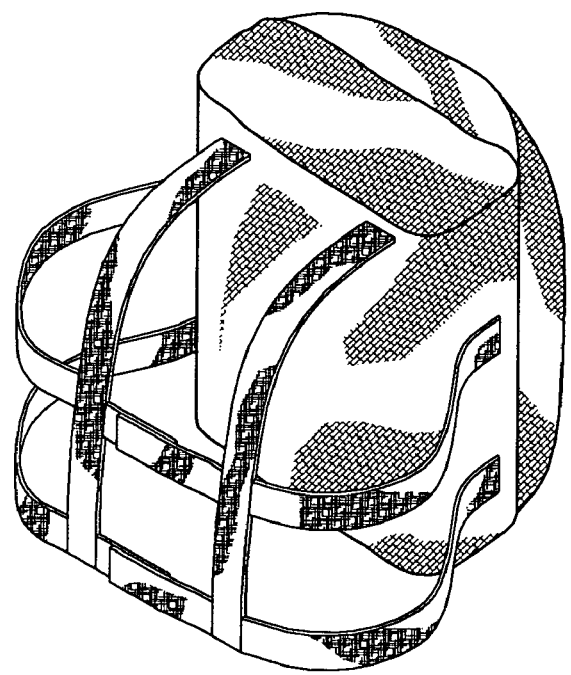
FIG. 4 is a view of the device in the storage state.

The present invention can be collapsed and folded into a small size. In the storage state, the present invention can be used as a backpack. FIG. 4 The raft 10 is also equipped with a self-inflation mechanism that allows a user to quickly inflate the raft 10 when an emergency arises.

Because of the exposure to water the choice of material should be non-corrosive and durable; plastic is probably an excellent choice of material.

What is claimed is:

1. A device to be used during emergency situations comprising:
   a. an inflatable floatation means;
      wherein the floatation means has a bottom, side walls, and an open top;
   b. a flexible cover;
      wherein said cover is waterproof;
      wherein said cover covers the open top of the floatation means;
      wherein said cover is removably attached to the floatation means through a hook and loop means;
      wherein said cover has an opening substantially the size required to insert the user's head;
      wherein said cover has openings substantially the size required to insert the user's arms;
   c. a telescopic shaft;
      wherein the shaft has a top and bottom end;
      wherein the bottom end is secured at the bottom of the floatation means;

wherein the top end extends upward out of the open top of the floatation means;
d. a plurality of support members;
wherein the support members have a first and second end;
wherein the first end is secured to the side wall of the floatation means;
wherein the second end is secured to the telescopic shaft;
e. a plurality of wind catching means;
wherein the wind catching means are rotatably attached around the telescopic shaft;
f. a plurality of electric generators;
wherein the electric generators are fixedly attached to the telescopic shaft;
wherein the electric generators are connected to the wind catching means through conductive means;
g. a battery;
wherein said battery is located within the bottom floor of the floatation means;
wherein said battery is connected to the generators through conductive means;
h. an emergency light emitting device;
wherein said light emitting device is fixedly attached to the top end of the telescopic shaft;
i. an electric motor;
wherein the electric motor is located within the bottom floor of the floatation means;
wherein the electric motor is connected to the battery through conductive means;
wherein the motor is powered by the battery;
j. a propeller;
wherein said propeller is fixedly attached to the motor along a rotating axle;
wherein said propeller is located outside of the bottom floor of the floatation means; and
wherein said propeller is powered by the motor.

2. The device described in claim 1 wherein the device is folded and compressed into a portable container when not in use.

* * * * *